United States Patent
Bayramoglu

(10) Patent No.: US 10,248,265 B2
(45) Date of Patent: Apr. 2, 2019

(54) TOUCH DETECTING PANEL

(71) Applicant: Nihat Deniz Bayramoglu, Henderson, NV (US)

(72) Inventor: Nihat Deniz Bayramoglu, Henderson, NV (US)

( * ) Notice: Subject to any disclaimer, the term of this patent is extended or adjusted under 35 U.S.C. 154(b) by 0 days.

(21) Appl. No.: 14/588,347

(22) Filed: Dec. 31, 2014

(65) Prior Publication Data
US 2016/0188034 A1    Jun. 30, 2016

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ........... G06F 3/041; G06F 2203/04112; G06F 3/044; G06F 2203/04111
See application file for complete search history.

(56) References Cited

U.S. PATENT DOCUMENTS

| | | |
|---|---|---|
| 4,550,221 A | 10/1985 | Mabusth |
| 5,381,160 A | 1/1995 | Landmeier |
| 6,005,555 A | 12/1999 | Katsurahira et al. |
| 6,137,427 A | 10/2000 | Binstead |
| 6,188,391 B1 | 2/2001 | Seely et al. |
| 6,970,160 B2 | 11/2005 | Mulligan et al. |
| 7,030,860 B1 | 4/2006 | Hsu et al. |
| 7,292,229 B2 | 11/2007 | Morag et al. |
| 2004/0119701 A1 | 6/2004 | Mulligan et al. |
| 2005/0030048 A1 | 2/2005 | Bolender |
| 2006/0066581 A1 | 3/2006 | Lyon et al. |
| 2008/0314626 A1* | 12/2008 | Moore .......................... 174/255 |
| 2009/0160682 A1 | 6/2009 | Bolender |
| 2011/0037727 A1* | 2/2011 | Lee ........................ G06F 3/0416 345/174 |
| 2011/0048812 A1* | 3/2011 | Yilmaz .................... G06F 3/044 178/18.06 |
| 2011/0062969 A1* | 3/2011 | Hargreaves et al. ......... 324/658 |

(Continued)

FOREIGN PATENT DOCUMENTS

JP    60075927    4/1985

OTHER PUBLICATIONS

Korean Office Action; dated May 18, 2009 for SN 10-2007-0133201.

(Continued)

*Primary Examiner* — Aneeta Yodichkas
(74) *Attorney, Agent, or Firm* — Gokalp Bayramoglu

(57) ABSTRACT

The present invention is a touch detection panel that uses capacitance changes between electrodes and changes thereof to determine a position of touch. The touch panel can be used in commercial applications where using a finger, stylus, or other object is the desired method of interface with an electronic system. The touch panel includes conductive electrodes and conductive lines connecting the conductive electrodes. The conductive electrodes themselves can be made of opaque conductive material, substantially transparent conductive material, or transparent conductive material depending on the requirements of an application. The Touch panel is connected to a controller that applies current and/or voltage to the touch panel and senses current and/or voltage from the touch panel to determine either single or multiple touch locations.

8 Claims, 11 Drawing Sheets

(56) References Cited

U.S. PATENT DOCUMENTS

| | | | |
|---|---|---|---|
| 2012/0182229 A1* | 7/2012 | Shepelev et al. | 345/173 |
| 2012/0274603 A1* | 11/2012 | Kim | G06F 3/0412 345/174 |
| 2013/0106743 A1* | 5/2013 | Xie et al. | 345/173 |
| 2013/0141357 A1* | 6/2013 | Lo | G06F 3/044 345/173 |
| 2013/0293792 A1* | 11/2013 | You | G06F 3/044 349/12 |
| 2014/0022466 A1* | 1/2014 | Lo | G06F 3/044 349/12 |
| 2014/0152615 A1* | 6/2014 | Chang | G06F 3/044 345/174 |
| 2014/0184559 A1* | 7/2014 | Han | G06F 3/0412 345/174 |
| 2014/0210774 A1* | 7/2014 | Kim | G06F 3/044 345/174 |
| 2014/0375907 A1* | 12/2014 | Wu | G06F 3/0412 349/12 |

OTHER PUBLICATIONS

EP Office Action dated Jan. 1, 2009;SN 07018556.6.
U.S. Appl. No. 10/279,828.
A communication from the European Patent Office dated Sep. 16, 2008 regarding the corresponding foreign patent application EPO07018556.

* cited by examiner

TOUCH DETECTING PANEL

BACKGROUND

Human-machine interface has long been studied and different methods have been developed to interface with machines. Entering characters on a keyboard is one way of entering information into a machine. Using a mouse device is another method to enter information into a computer device by moving a cursor on a screen and pointing to a certain area to enter information. Further, a combination of a keyboard and a mouse device can be used to enter information into a computer device. However, instead of using a keyboard and a mouse combination, a touch panel can be used. A touch panel may either be placed over a display device or may be embedded on a display device or a mouse pad to enter information to a machine. Touch panels detect the object touching the surface of the touch panel and produces a signal that indicate the position of the touch. There are different touch technologies including resistive, capacitive, projected capacitive, acoustic, force and optical.

In recent years, the most popular technology is a projective capacitive technology due to its ability to detect multiple touches, meaning if several objects touch the touch panel at different locations, those touch locations of all the objects can be determined either simultaneously or in a very short period of time from each other.

Multiple touch projective capacitive touch panels detect the change in current or voltage due to change in capacitance when an object touches the touch panel. When a current is applied to an electrode of a capacitive touch panel all the capacitances on those electrodes are charged and this charging takes some time. This affects the speed of the panel.

Capacitive touch panels usually have electrodes placed on a substrate in two different directions that are substantially perpendicular to each other. For example electrodes on a horizontal axis are placed as multiple rows and electrodes on a vertical axis are placed as multiple columns. A typical structure is shown in FIG. 1. Electrodes can be either placed on a single layer or on two separate layers. When a single layer structure is used, electrodes are connected with conductive lines and the conductive lines of different axis are insulated from each other where they cross each other. Manufacturing process of a single layer touch panel, therefore requires adding insulator between the conductive lines of different directions.

SUMMARY OF THE INVENTION

One objective of the invention is to eliminate the need for using insulators between the conductive lines of different direction conductive lines.

Another object of the invention is to manufacture a touch panel wherein all electrodes are placed on the same layer of a substrate and self capacitance and mutual capacitance between the electrodes and between electrodes and earth are used to determine the location of a touch.

Another object of the invention is to build a touch panel wherein a plurality of capacitances on a surface are used to determine a single or multiple touch locations.

Another object of the invention is to provide a touch panel wherein as the size increases, regardless of the touch panel structure, the speed of the touch panel is kept at an acceptable level.

Another object of the invention is to provide a formula for designing a touch panel wherein proper variables are used to change the touch panel design that is sensitive to touches on its surface.

Another object of the invention is to provide a touch panel wherein the frequency of the input signal is changed to find the filter characteristics of the touch panel and therefore determining the optimum signal frequency to apply to each electrode line therefore increasing the signal to noise ratio.

DETAILED DESCRIPTION OF EMBODIMENTS

Figure 1:
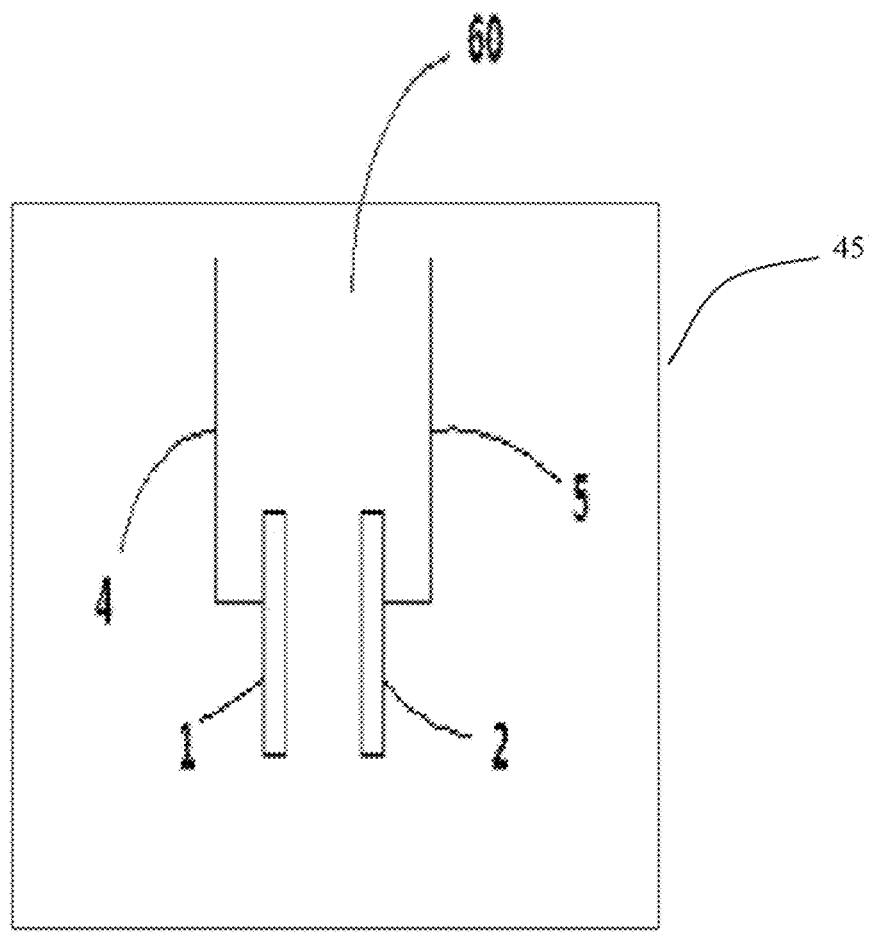
FIG. 1 shows a capacitor with two conductive electrodes panel that uses insulators to insulate conductive lines in different directions

FIG. 1 shows a capacitor 60 wherein the capacitance is formed between conductive electrode 1 and conductive electrode 2. Conductive line 4 and conductive line 5 carry electrical current to move electrical charges into and from the capacitor 60. A capacitance is created between conductive electrode 1 and conductive electrode 2 as a result of the structure. The length of conductive electrode 1 and conductive electrode 2, the distance between conductive electrode 1 and conductive electrode 2, and the permittivity of the material used to build conductive electrode 1 and conductive electrode 2 determine the amount of the capacitance generated between conductive electrode 1 and conductive electrode 2.

Figure 2:
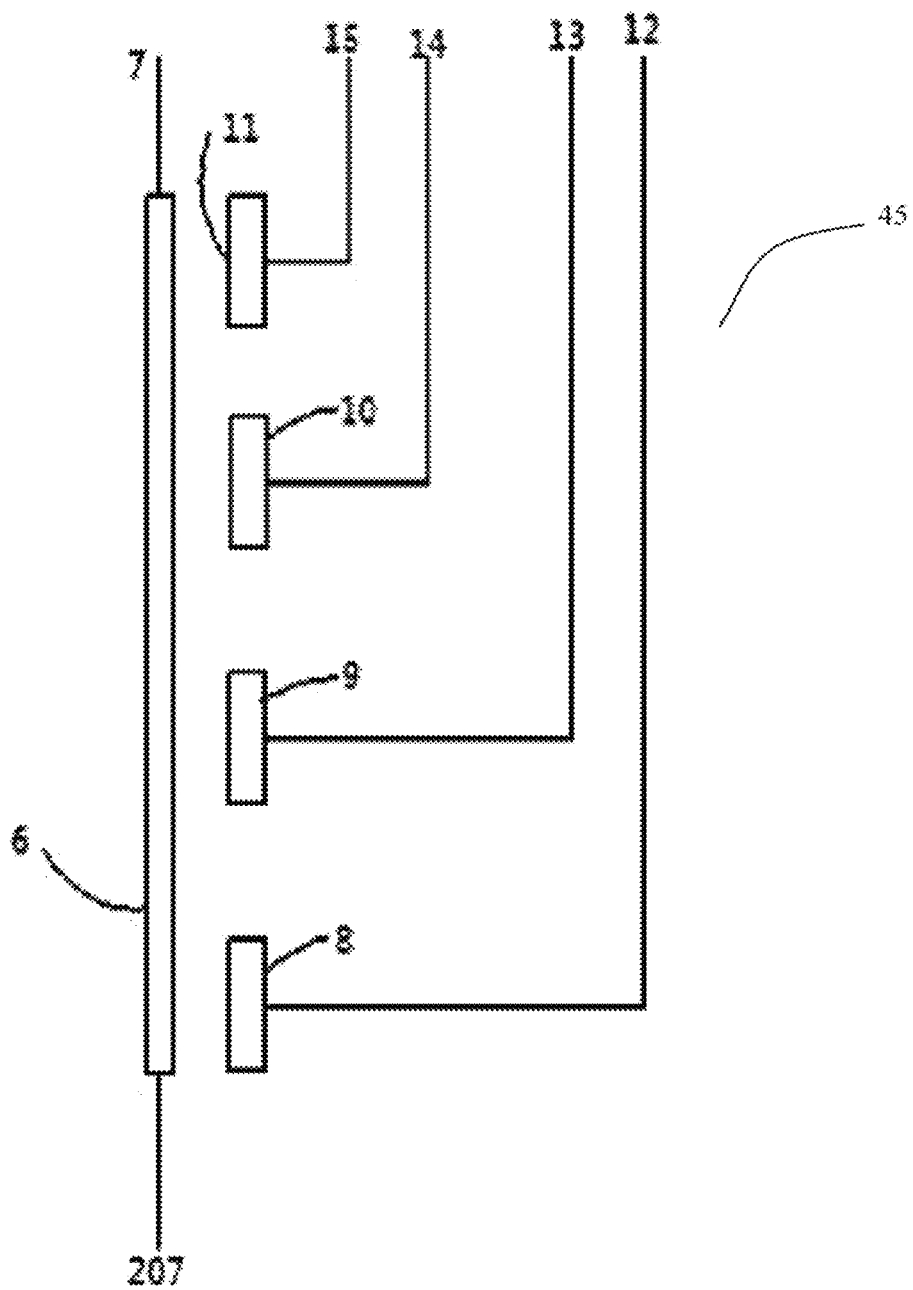
FIG. 2 shows the electrode set up of the capacitive touch screen

FIG. 2 shows an embodiment of the current invention. In FIG. 2, conductive electrode 6 is made of a conductive material. The width and the length of conductive electrode 6 are determined based on the resistance of the material used as well as the mutual capacitance desired between conductive electrode 6 and conductive electrodes 8, 9, 10 and 11. Conductive electrodes 6, 8, 9, 10, and 11 can be made of a transparent, a substantially transparent or an opaque conductive material. For example for a conductive transparent material, indium tin oxide can be used. For conductive opaque material, silver, copper, gold, or any other conductive metal can be used. The dimensions of conductive electrode 6 is adjusted to provide a capacitance where signal to noise ratio at the output of the capacitive panel is maximized. Conductive electrodes 8, 9, 10, and 11 are made of conductive materials. The dimensions of conductive electrodes 6, 8, 9, 10, and 11 are adjusted to provide a capacitance between conductive electrode 6 and conductive electrodes 8, 9, 10, and 11 such that the signal to noise ratio at the output of each conductive electrode is maximized. Conductive electrode 6 is connected to a controller (not shown) by using conductive line 7 and conductive line 207. Conductive electrodes 8, 9, 10, and 11 are connected to a controller by using conductive lines 12, 13, 14, and 15 respectively.

Figure 3:
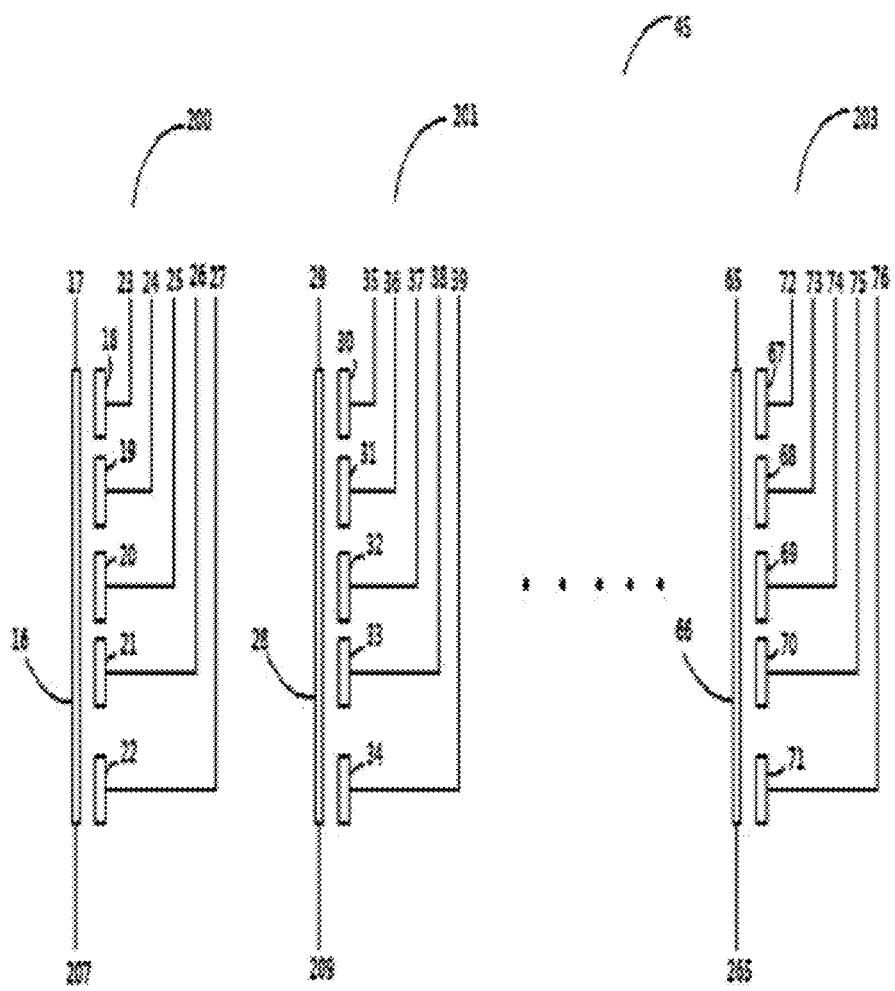
FIG. 3 shows the electrode layout of the capacitive touch panel

FIG. 3 shows the top view of a part of a capacitive touch panel. The touch panel is made of multiple conductive electrodes and conductive lines connecting conductive electrodes to a controller. Electrode group 200 includes conductive electrodes 16, 18, 19, 20, 21 and 22. Conductive lines 17 and 207 are used to connect conductive electrode 16 to a controller (not shown). Conductive line 23 connects conductive electrode 18 to a controller. Conductive line 24 connects conductive electrode 19 to a controller. Conductive line 25 connects conductive electrode 20 to a controller. Conductive line 26 connects conductive electrode 21 to a controller. Conductive line 27 connects conductive electrode 22 to a controller.

Electrode group 201 includes conductive electrodes 28, 30, 31, 32, 33, and 34. Conductive line 29 and conductive line 209 are used to connect conductive electrode 28 to a controller (not shown). Conductive line 35 connects conductive electrode 30 to a controller. Conductive line 36 connects conductive electrode 31 to a controller. Conductive line 37 connects conductive electrode 32 to a controller. Conductive line 38 connects conductive electrode 33 to a controller. Conductive line 39 connects conductive electrode 34 to a controller.

Electrode group 203 includes conductive electrodes 66, 67, 68, 69, 70, and 71. Conductive lines 65 and 265 are used to connect conductive electrode 66 to a controller (not shown). Conductive line 72 connects conductive electrode 67 to a controller. Conductive line 73 connects conductive electrode 68 to a controller. Conductive line 74 connects conductive electrode 69 to a controller. Conductive line 75 connects conductive electrode 70 to a controller. Conductive line 76 connects conductive electrode 71 to a controller.

A controller in this invention is defined as an electrical circuit that can apply an alternating or a direct current to conductive electrodes 16, 28, and 66 while the controller can sense current from conductive electrodes 18, 19, 20, 21, 22, 30, 31, 32, 33, 34, 67, 68, 69, 70, and 71.

FIG. 3 shows only three electrode groups 200, 201, and 203. The touch panel may include many of these electrode groups depending upon the size of the touch panel. The larger the touch panel, the more number of electrode groups are needed. While FIG. 3 shows that conductive electrodes 16, 28 and 66 are connected to a controller by two wires, a single wire configuration is also possible. For example conductive electrode 16 can be connected to a controller using only one conductive line either conductive line 17 or conductive line 207. Likewise conductive electrode 28 can be connected to a controller using only one conductive line; either conductive line 29 or conductive line 209. Conductive electrode 66 can be connected to a controller using only one conductive line either conductive line 65 or conductive line 265.

Conductive lines 17, 207, 29, 209, 65 and 265 can be made of a transparent, substantially transparent or opaque conductive material. For example for a conductive transparent material, indium tin oxide can be used. For conductive opaque material, silver, copper, gold, or any other conductive material can be used. Conductive electrodes 16, 28, and 66 can be made of a transparent, a substantially transparent or an opaque conductive material. For example for a conductive transparent material, indium tin oxide can be used. For a conductive opaque material, silver, copper, gold, or any other conductive material can be used. The dimensions of conductive electrodes 16 are adjusted to provide a capacitance between conductive electrode 16 and conductive electrodes 18, 19, 20, 21, and 22 where the signal to noise ratio at the output of the capacitive panel is maximized. The dimensions of conductive electrode 28 are adjusted to provide a capacitance between conductive electrode 28 and conductive electrodes 30, 31, 32, 33, and 34 where the signal to noise ratio at the output of the capacitive panel is maximized. The dimensions of conductive electrode 66 are adjusted to provide a capacitance between conductive electrode 66 and conductive electrodes 67, 68, 69, 70, and 71 where the signal to noise ratio at the output of the capacitive panel is maximized.

The capacitive panel is made of many of these electrode groups generating mutual capacitance between them and multiple self capacitances between each individual conductive electrode and ground. Conductive electrodes 18, 19, 20, 21, and 22 are made of conductive materials. Conductive materials can be a transparent, a substantially transparent or an opaque conductive material. For example for a conductive transparent material, indium tin oxide can be used. For a conductive opaque material, silver, copper, gold, or any other conductive material can be used. The dimensions of conductive electrodes 18, 19, 20, 21, and 22 are adjusted to provide capacitances between conductive electrode 16 and conductive electrodes 18, 19, 20, 21, and 22 wherein signal to noise ratio at the output of each conductive electrodes 18, 19, 20, 21, and 22 are maximized. Conductive electrodes 18, 19, 20, 21, and 22 are connected to a controller circuit to determine a touch location by conductive lines 23, 24, 25, 26, and 27 respectively. Conductive lines 23, 24, 25, 26, and 27 can be made of a transparent, a substantially transparent or an opaque conductive material. For example for a conductive transparent material, indium tin oxide can be used. For a conductive opaque material, silver, copper, gold, or any other conductive material can be used.

Conductive electrodes 30, 31, 32, 33, and 34 are made of conductive materials. Conductive materials can be a transparent, a substantially transparent or an opaque conductive material. For example for a conductive transparent material, indium tin oxide can be used. For a conductive opaque material, silver, copper, gold, or any other conductive material can be used. The dimensions of conductive electrodes 30, 31, 32, 33, and 34 are adjusted to provide capacitances between conductive electrode 16 and conductive electrodes 30, 31, 32, 33, and 34 wherein signal to noise ratio at the output of each conductive electrodes 30, 31, 32, 33, and 34 are maximized. Conductive electrodes 30, 31, 32, 33, and 34 are connected to a controller by using conductive lines 35, 36, 37, 38, and 39. Conductive lines 35, 36, 37, 38, and 39 can be made of a transparent, a substantially transparent or an opaque conductive material. For example for a conductive transparent material, indium tin oxide can be used. For a conductive opaque material, silver, copper, gold, or any other conductive material can be used.

Conductive electrodes 67, 68, 69, 70, and 71 are made of conductive materials. Conductive materials can be a transparent, a substantially transparent or an opaque conductive material. For example for a conductive transparent material, indium tin oxide can be used. For a conductive opaque material, silver, copper, gold, or any other conductive material can be used. The dimensions of conductive electrodes 67, 68, 69, 70, and 71 are adjusted to provide capacitances between conductive electrode 16 and conductive electrodes 67, 68, 69, 70, and 71 wherein signal to noise ratio at the output of each conductive electrodes 67, 68, 69, 70, and 71 are maximized. Conductive electrodes 67, 68, 69, 70, and 71 are connected to a controller circuit by using conductive lines 72, 73, 74, 75, and 76. Conductive lines 72, 73, 74, 75, and 76 can be made of a transparent, a substantially transparent or an opaque conductive material. For example for a conductive transparent material, indium tin oxide can be used. For a conductive opaque material, silver, copper, gold, or any other conductive material can be used.

In one embodiment, an alternating current is applied to conductive electrodes 16, 28 and 66. The current to these lines is applied one electrode at a time. For example an alternating current is applied to conductive electrode 16 while no current is applied to conductive electrode 28 and conductive electrode 66. Due to the structure of the conductive electrodes 16, 18, 19, 20, 21, and 22, mutual capacitances exist between conductive electrodes 16 and 18, 16 and 19, 16 and 20, 16 and 21 and 16 and 22. When an alternating current is applied to conductive electrode 16, multiple capacitive reactances form between conductive electrodes 16 and 18, conductive electrodes 16 and 19, conductive electrodes 16 and 20, conductive electrodes 16 and 21 and conductive electrodes 16 and 22. The value of the capacitive reactance is determined by the frequency of the alternating current applied to conductive electrode 16 and the geometry of conductive electrode 16 and conductive electrodes 18, 19, 20, 21, and 22. The capacitive reactances between conductive electrode 16 and conductive electrodes 18, 19, 20, 21, and 22 form a path for the alternating current from conductive electrode 16 to conductive electrodes 18, 19, 20, 21, and 22. Current flow from conductive electrode 16 to conductive electrode 18 and current flow from conductive electrode 16 to conductive electrode 19 are substantially similar. The differences may arise due to changes in manufacturing process. Likewise, the current flow from conductive electrode 16 to conductive electrode 19 is substantially similar to the current flow from conductive electrode 16 to conductive electrode 20. The current flow from conductive electrode 16 to conductive electrode 20 is substantially similar to the current flow from conductive electrode 16 to conductive electrode 21. The current flow from conductive electrode 16 to conductive electrode 21 is substantially similar to the current flow from conductive electrode 16 to conductive electrode 22. Current flows from conductive line 16 to conductive electrodes 18, 19, 29, 21 and 22 due to the mutual capacitance exists between conductive line 16 and conductive electrodes 18, 19, 20, 21, and 22. In this embodiment, there are five conductive electrodes that are smaller than conductive electrode 16. Conductive electrode 16 is also called driving electrode because a current is applied to conductive electrode 16 and as a result of this current flow, an electrical field is generated. Conductive electrodes 18, 19, 20, 21, and 22 are also called sensing electrodes because conductive electrodes 18, 19, 20, 21, and 22 are connected to sensing circuit in the controller by corresponding conductive lines 23, 24, 25, 26, and 27. The number of sensing electrodes and corresponding conductive lines can vary as needed for any given application of the touch panel.

In another embodiment, a current may be applied to conductive electrodes 16, 28 and 66 at the same time. When the current is applied to conductive electrodes 16, 28 and 66 at the same time, conductive electrodes 18, 19, 20, 21, 22, 30, 31, 32, 33, 34, 67, 68, 69, 70, and 71 are sensed to detect the touch location. If there is no touch, a map of the touch panel is created in controller 70. This map is a map of voltage distribution or current distribution or capacitance distribution. When there is a touch on the surface of touch panel 45 (in FIG. 10) the map will change and this change will be used to detect the touch point on touch panel 45.

Figure 8:
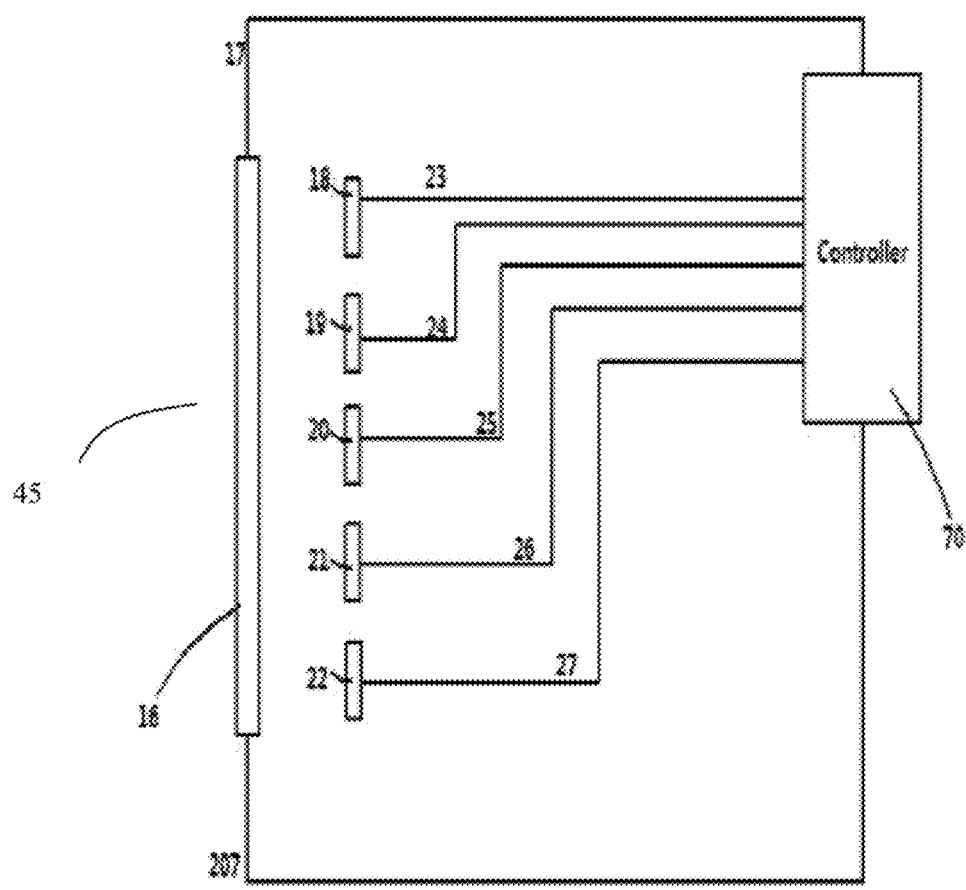
FIG. 8 shows one group of electrodes being connected to the controller
Figure 9:
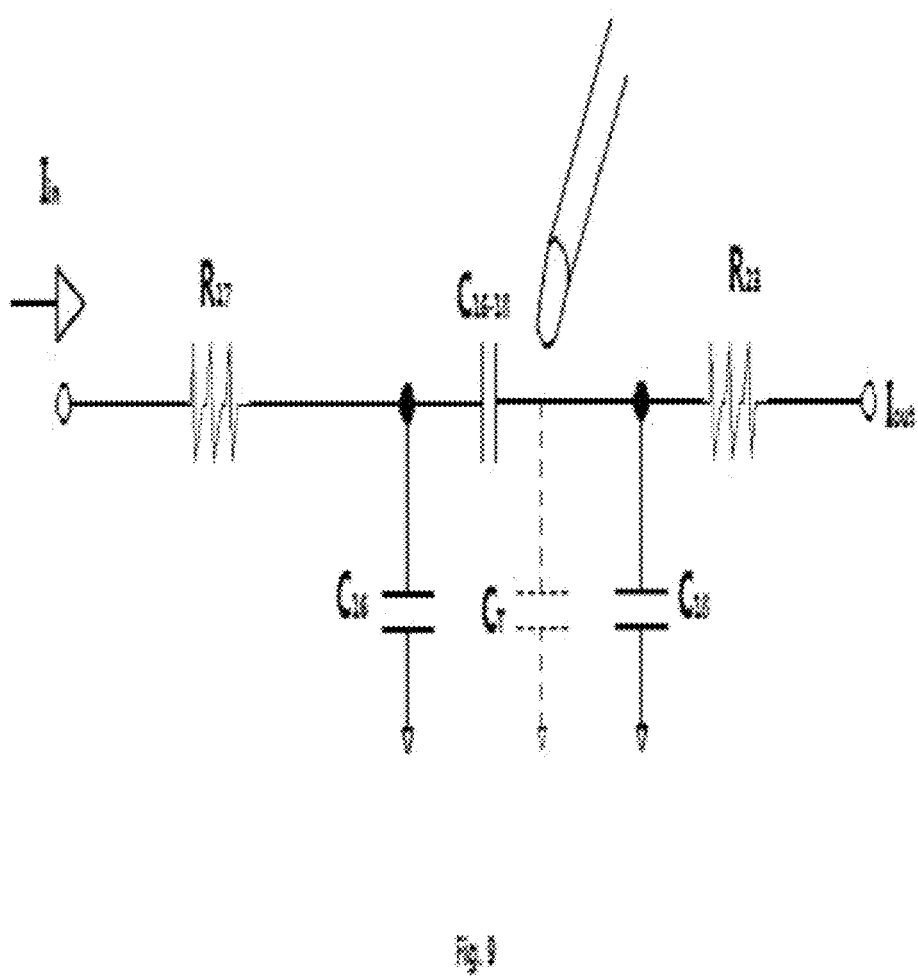
FIG. 9 shows the equivalent circuit of two electrodes with mutual capacitance

Conductive lines 23, 24, 25, 26, and 27, are connected to a controller circuit as shown in FIG. 8. If no object touches the surface of substrate 45 of FIG. 10, the output current or voltage measured at conductive lines 23, 24, 25, 26, and 27 would be substantially similar to each other. However if an object with capacitance, such as a finger, touches or comes to close proximity of conductive electrodes 16, 18, 19, 20, 21, and 22 then the object or finger will introduce additional capacitance between the touch point and the ground. This phenomenon is shown in FIG. 9 which is the equivalent circuit showing all the resistances and capacitances in the circuit. For example if a finger touches the area between conductive electrode 16 and conductive electrode 18, an additional capacitance Ct from the touch point to ground would be introduced therefore changing the total capacitance. This change in capacitance would cause a change in capacitive reactance that would cause a change in the output signal. If only the area between conductive electrode 16 and conductive electrode 18 is touched then it would be detected by measuring the conductive lines 23, 24, 25, 26, and 27. While the output of conductive lines 24, 25, 26, and 27 would be similar to each other, the output at conductive line 23 would be different than others and this difference would indicate that an object touched between conductive electrode 16 and conductive electrode 18. The signal from conductive lines 23, 24, 25, 26 and 27 can be measured by using one of the different techniques. One technique is to use a charge counting circuit wherein a reference capacitor is charged to a supply voltage level. After the reference capacitor is charged, sensed capacitor is discharged and then charged by the reference capacitor. Each time the sensed capacitor is charged, it reaches to a different voltage than the previous charge. When the sensed capacitor voltage reaches to a threshold level then the number of charge/discharge cycles is counted and the capacitance is determined based on this charge count. An alternative method of measuring signals from conductive lines 23, 24, 25, 26, and 27 is to measure voltage. Based on the different voltage measurement, a touch location can be determined. For example if there is a touch between conductive electrodes 16 and 18, the voltage on line 23 will be different than voltages on conductive lines 24, 25, 26, and 27. Controller 70 to determine that the touch location is between conductive electrode 16 and conductive electrode 18 detects this difference.

The circuit structure shown in FIG. 8 can be modeled as a filter circuit. In this circuit there are multiple capacitances between conductive electrode 16 and the ground, between conductive electrode 18 and the ground, between conductive electrode 19 and the ground, between conductive electrode 21 and the ground and between conductive electrode 22 and the ground. There are also mutual capacitances between conductive electrode 16 and conductive electrodes 18, 19, 20, 21, and 22. Besides these capacitances, there may be other stray capacitances and inductances in the circuit. All these additional capacitances and inductances would affect the operation of the circuit and therefore would change the filter transfer function of the touch panel. The transfer function here is defined as a curve showing the output voltage of the circuit plotted versus the frequency. Based on the circuit characteristics each electrode group may have a different filter transfer function. Furthermore each conductive electrode pair within each electrode group may have a different filter transfer function. These differences are a result of geometry and material variations during manufacturing. Controller 70 applies a signal to conductive electrode 16 at a certain frequency. For example if the input signal is a square wave signal then the fundamental frequency of the input signal is changed and output of the circuit is measured to determine the filter characteristics. These filter characteristics are used to determine the best driving frequency to obtain a higher signal to noise ratio.

Under normal operation, controller 70 is connected to many electrode groups forming the touch panel. When there is no touch on the surface of touch panel 45, a map of the touch panel signals is generated within controller 70. When there is a touch, the touch location would generate a different signal and the saved map therefore indicating the touch location. This operation is performed in the following manner: A current is applied to conductive electrode 16, conductive electrode 28 and conductive electrode 66 either in a sequential manner or at the same time. If the current is applied to conductive electrode 16, 28 and 66 in a sequential manner, then when the current is applied to one of the conductive electrodes 16, 28, and 66, all other respective sensing conductive electrodes 18, 19, 20, 21, 22, 30, 31, 32, 33, 34, 67, 68, 69, 70, and 71 are sensed. This way a map of voltages, currents, or capacitance of touch panel is stored in the memory of controller 70. The same process is repeated over and over. If there is no touch on the panel, the map will be similar to the previous map. If there is a touch, the map will change since new capacitance is introduced. The change in map is used to detect the touch location.

FIG. 3 further shows other conductive electrodes 28, 30, 31, 32, 33, 34, 66, 67, 68, 69, 70, and 71. Conductive lines 29 and 65 can be made of a transparent material, a substantially transparent material or an opaque conductive material. For example for a conductive transparent material, indium tin oxide can be used. For conductive opaque material, silver, copper, gold, or any other conductive material can be used. Conductive electrodes 30, 31, 32, 33, 34, 67, 68, 69, 70, and 71 can be made of a transparent, a substantially transparent or an opaque conductive material. For example for a conductive transparent material, indium tin oxide can be used. For a conductive opaque material, silver, copper, gold, or any other conductive material can be used. The dimensions of capacitive electrodes 29 and 65 are adjusted to provide a capacitance between conductive electrode 29 and conductive electrodes 30, 31, 32, 33, and 34 and between conductive electrode 66 and conductive electrodes 67, 68, 69, 70, and 71 The capacitive panel is made of many of these conductive electrodes generating mutual capacitance between them and multiple self capacitance between each individual conductive electrode and ground. Conductive electrodes 30, 31, 32, 33, 34, 67, 68, 69, 70, and 71 are made of conductive materials. Conductive materials can be a transparent, a substantially transparent or an opaque conductive material. For example for a conductive transparent material, indium tin oxide can be used. For a conductive opaque material, silver, copper, gold, or any other conductive material can be used. The dimensions of conductive electrodes 30, 31, 32, 33, 34, 67, 68, 69, 70, and 71 are adjusted to provide capacitances between conductive electrode 28 and conductive electrodes 30, 31, 32, 33, and 34 and between conductive electrodes 66 and 67, 68, 69, 70 and 71 wherein signal to noise ratio at the output of each conductive electrodes 30, 31, 32, 33, 34, 67, 68, 69, 70, and 71 are maximized. Conductive electrodes 30, 31, 32, 33, 34, 67, 68, 69, 70, and 71 are connected to a controller circuit to determine a touch location. These connections to the controller circuit is accomplished by using conductive lines 35, 36, 37, 38, 39, 72, 73, 74, 75, and 76. Conductive lines 35, 36, 37, 38, 39, 72, 73, 74, 75, and 76 can be made of a transparent, a substantially transparent or an opaque conductive material. For example for a conductive transparent material, indium tin oxide can be used. For a conductive opaque material, silver, copper, gold, or any other conductive material can be used.

During the operation of the touch panel, a current is applied to conductive line 29. This current flows through conductive line 29 and reaches conductive electrode 28. Due to the structure of the conductive electrodes 28, 30, 31, 32, 33, and 34, mutual capacitances exist between conductive electrodes 28 and 30, 28 and 31, 28 and 32, 28 and 33 and 28 and 34. When an alternating current is applied to capacitive electrode 28, multiple capacitive reactance's form between conductive electrodes 28 and 30, the capacitance between conductive electrodes 28 and 31, the capacitance between conductive electrodes 28 and 32, the capacitance between conductive electrodes 28 and 33 and the capacitance between conductive electrodes 28 and 34. The value of the capacitive reactance is determined by the frequency of the alternating current applied to conductive electrode 28 and the geometry of conductive electrode 28 and conductive electrodes 30, 31, 32, 33, and 34. The capacitive reactance's between conductive electrodes 28 and conductive electrodes 30, 31, 32, 33, and 34 forms a path for the alternating current from conductive electrode 28 and conductive electrodes 30, 31, 32, 33, and 34. Current flows from conductive electrode 28 to conductive electrode 30 and current flows from conductive electrode 28 to conductive electrode 31 are substantially similar. Likewise, the current flow from conductive electrode 28 to conductive electrode 31 is substantially similar to the current flow from conductive electrode 28 to conductive electrode 32. The current flow from conductive electrode 28 to conductive electrode 32 is substantially similar to the current flow from conductive electrode 28 to conductive electrode 33. The current flow from conductive electrode 28 to conductive electrode 33 is substantially similar to the current flow from conductive electrode 28 to conductive electrode 34. Current flows from conductive electrode 28 to conductive electrodes 30, 31, 32, 33, and 34 due to the mutual capacitance exists between conductive electrode 28 and conductive electrodes 30, 31, 32, 33, and 34. In this embodiment, there are five conductive electrodes that are smaller than conductive electrode 28. Conductive electrode 28 is also called driving electrode because a current is applied to conductive electrode 28. Conductive electrodes 30, 31, 32, 33, and 34 are called sensing electrodes because conductive electrodes 30, 31, 32, 33, and 34 are connected to a sensing circuit in the controller by corresponding conductive lines 35, 36, 37, 38, and 39. A touch panel may have many of these conductive electrode pairs each pair corresponding to a touch location. Although the number of sensing electrodes in this embodiment is five, the number of sensing electrodes may change based on the size of the touch panel. Likewise while a single driving electrode is used for each electrode group, there may be more than one driving electrode(s). As a matter of fact there may be five driving electrodes, with one driving electrode corresponding to each sensing electrode. Further the number of driving electrodes (and corresponding sensing electrodes) can be more than five, and may increase up to any number. Further still, the ratio of driving electrodes to corresponding sensing electrodes can vary.

Conductive lines 35, 36, 37, 38, and 39 are connected to a controller circuit as shown in FIG. 8. If there were no object touching the surface of substrate 45, the output current or voltage measured at conductive lines 35, 36, 37, 38, and 39 would be substantially similar to each other. However if an object with capacitance, such as a finger, touches or comes to close proximity of conductive electrodes 28, 30, 31, 32, 33, and 34 then the object or finger will introduce additional capacitance between the touch point and ground. This phenomenon is shown in FIG. 9 which is the equivalent circuit showing all the resistances and capacitances in the circuit. For example if a finger touches the area between conductive electrode 28 and conductive electrode 30, an additional capacitance Ct from the touch point to ground would be introduced therefore changing the total capacitance. This change in capacitance would cause a change in capacitive reactance, which would cause a change in the output signal. If only the area between conductive electrode 28 and conductive electrode 30 is touched then it would easily be detected by measuring the conductive lines 35, 36, 37, 38, and 39. While the output of conductive lines 36, 37, 38, and 39 would be similar to each other, the output at conductive line 35 would be different than others and this difference would indicate that an object touched between conductive electrode 28 and conductive electrode 30.

Figure 4:
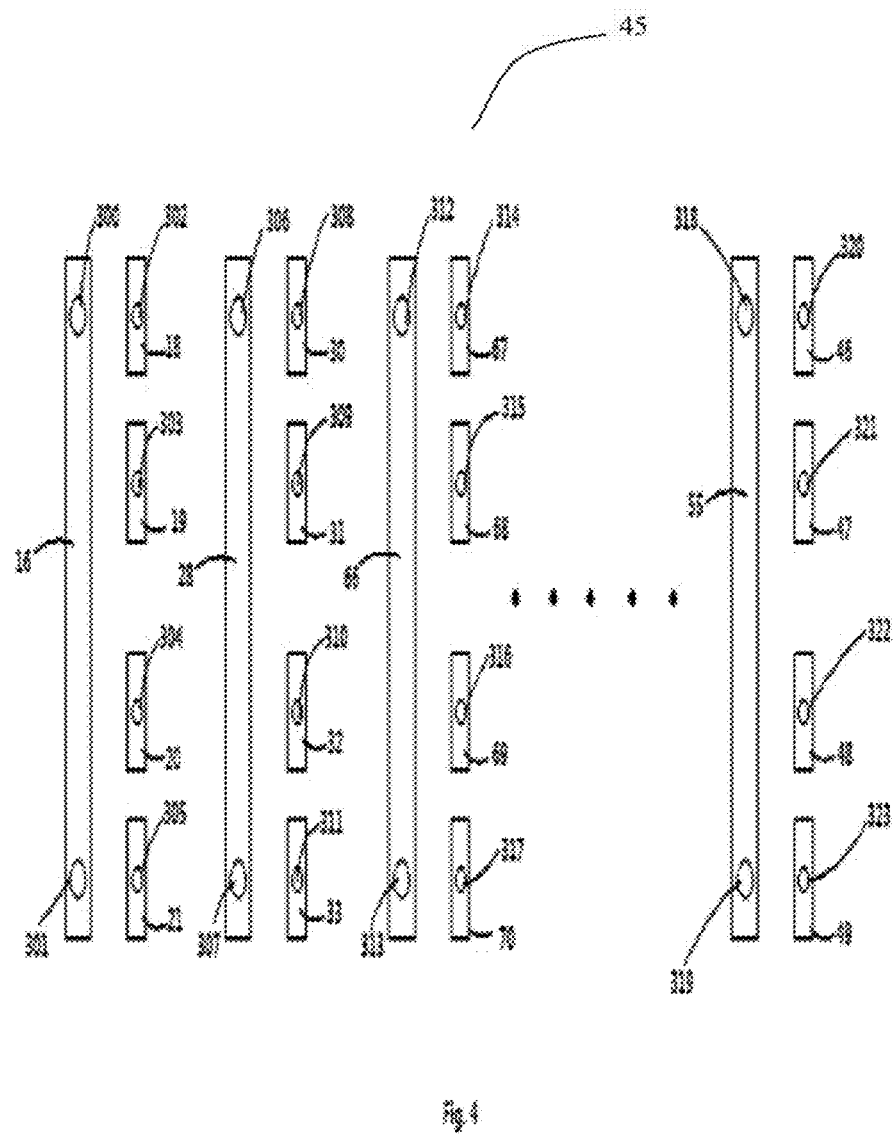
FIG. 4 shows the top view of the capacitive touch panel
Figure 5:
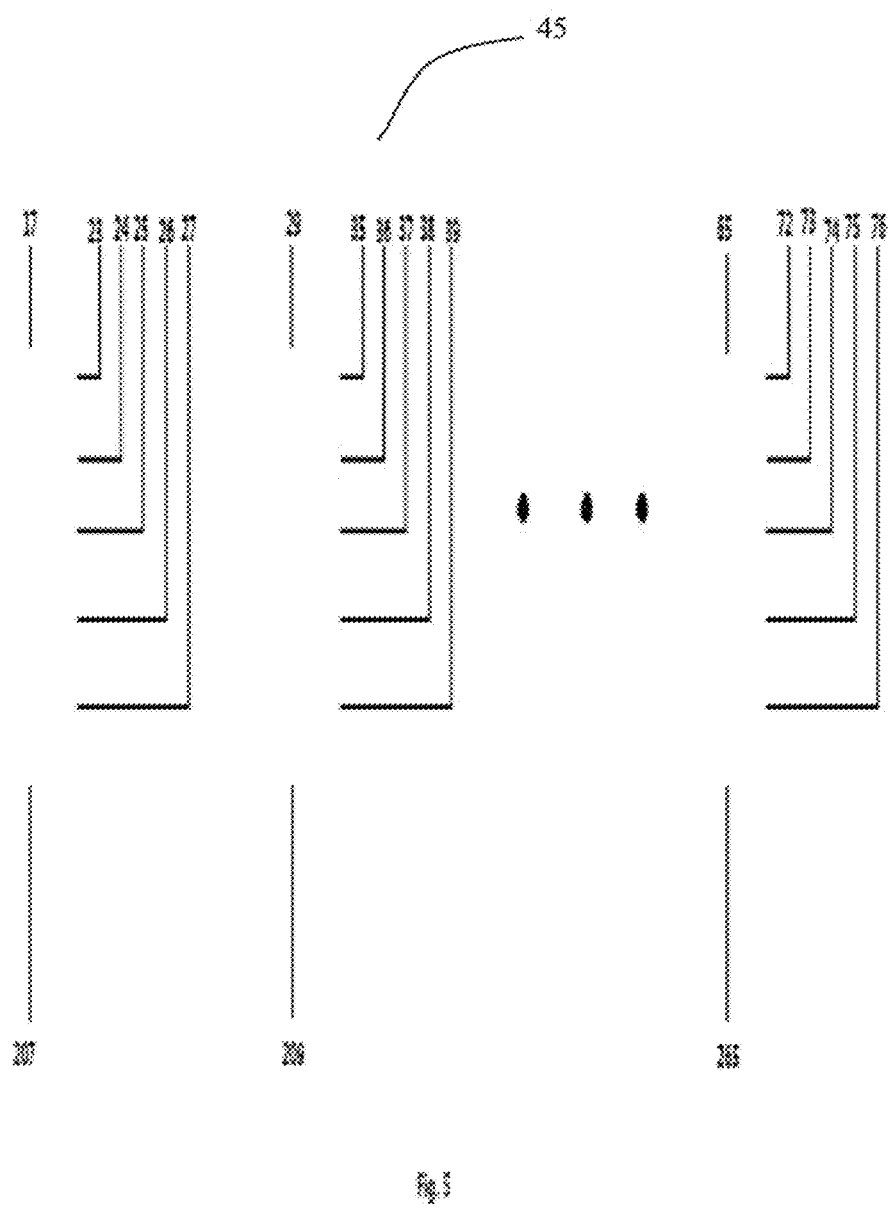
FIG. 5 shows the bottom view of the capacitive touch panel
Figure 6:
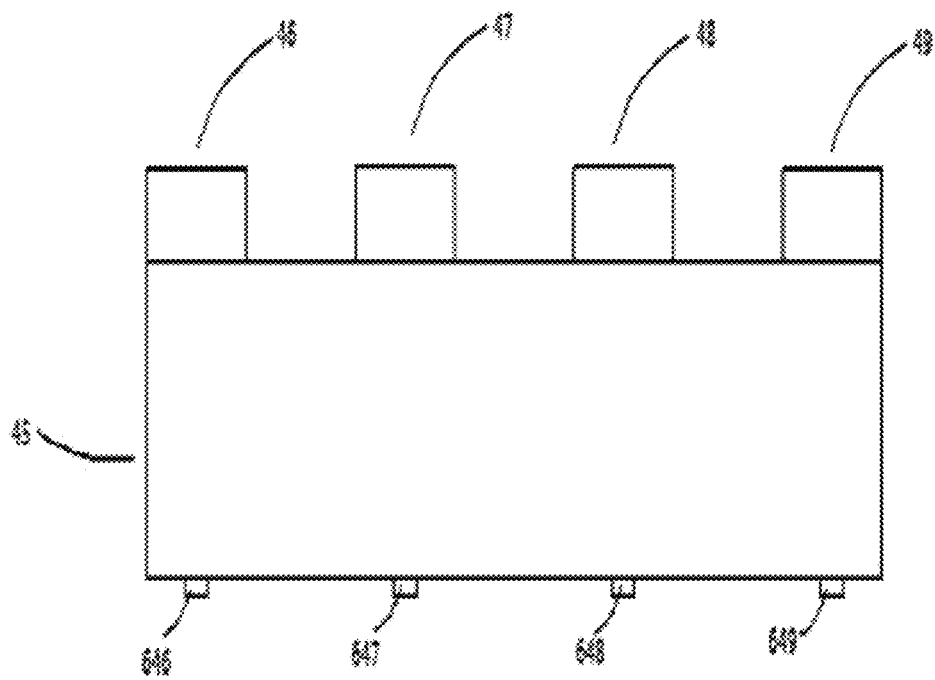
FIG. 6 shows cross section of a panel with single layer
Figure 7:
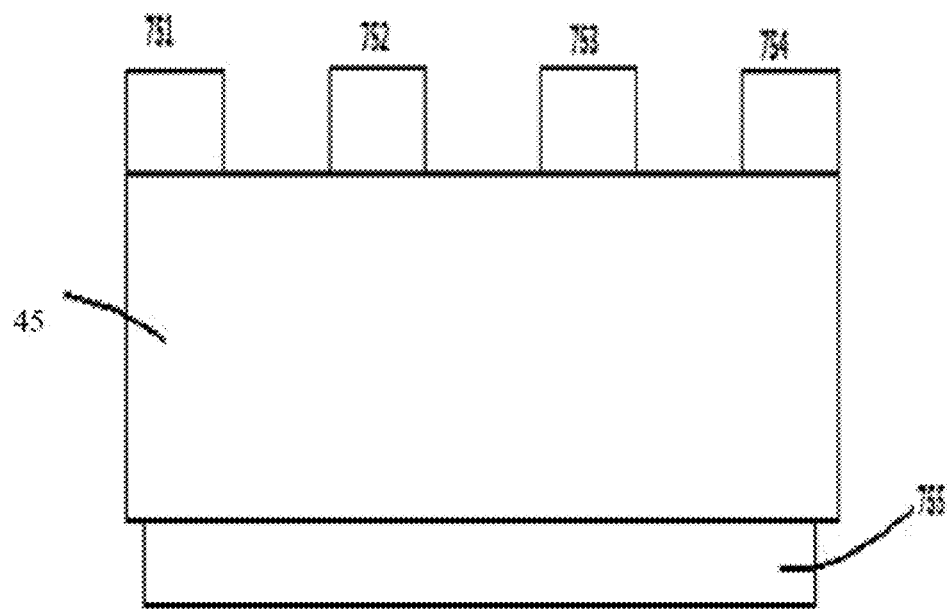
FIG. 7 shows cross section of a panel with double layers

FIG. 4 shows another embodiment. In this embodiment, conductive lines are placed on two different surfaces of substrate 45. FIG. 4 shows the top view of a dual layer structure. Conductive electrodes 16, 18, 19, 20, 21, and 22 and other conductive electrodes are placed on the top surface of substrate 45. Conductive lines 23, 24, 25, 26, and 27 are placed at the bottom layer of substrate 45 as shown in FIG. 5. Electrical connections from conductive electrodes 16, 18, 19, 20, 21, and 22 at the top surface to conductive lines 23, 24, 25, 26, and 27 at the bottom surface are provided by via holes 300-317. Via holes 300-317 are filled with conductive material and make contact to conductive electrodes at the top surface and conductive lines at the bottom surface. FIG. 6 shows a cross sectional view of FIG. 4 wherein conductive electrodes are placed on the top surface of substrate 45 and conductive lines 646, 647, 648, 649 on the bottom surface. FIG. 7 shows a cross sectional view of FIG. 4 and FIG. 5 wherein sensing conductive electrodes 751, 752, 753, 754 are shown at the top surface and driving electrode 755 at the bottom surface of substrate 45. FIG. 7 is an alternate embodiment showing a dual layer structure.

Figure 10:
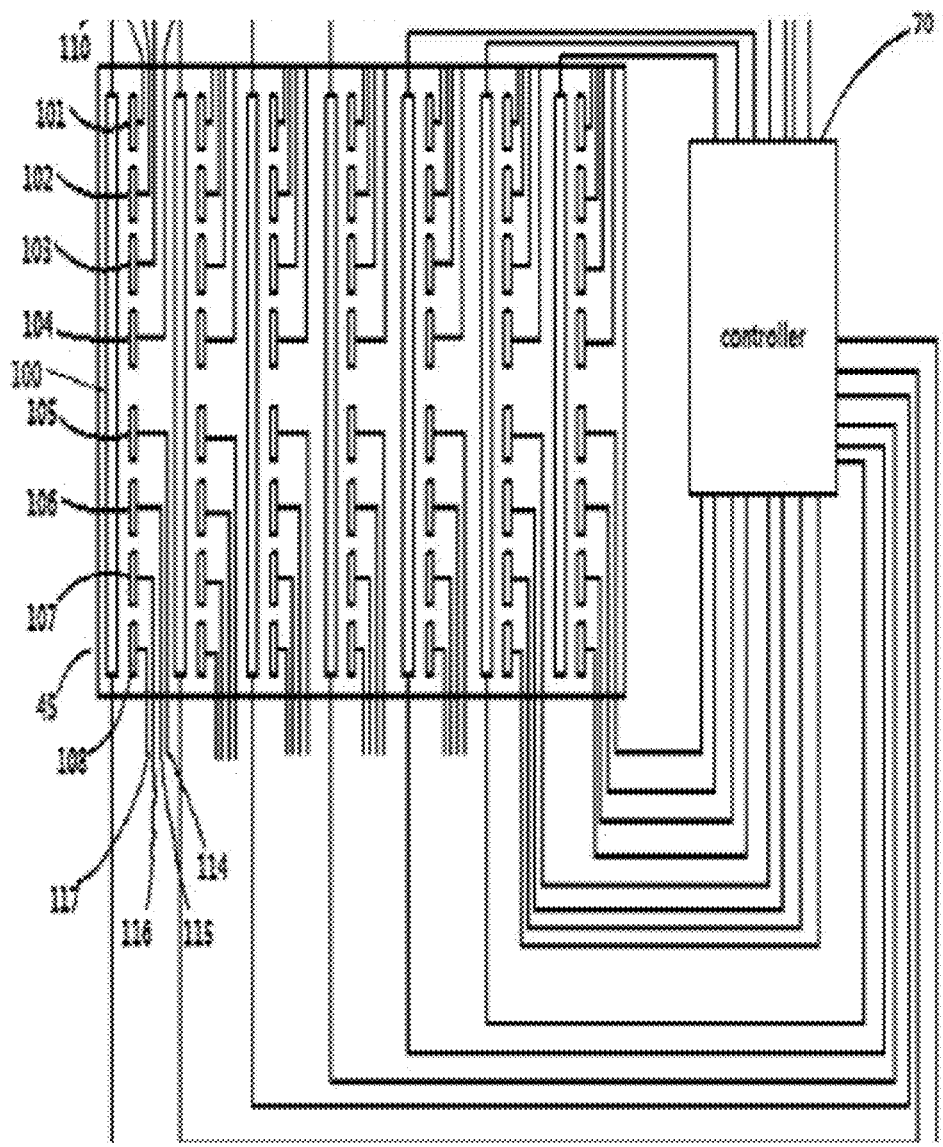
FIG. 10 shows a touch panel with all conductive electrodes and conductive lines placed on the same surface of a substrate
Figure 11:
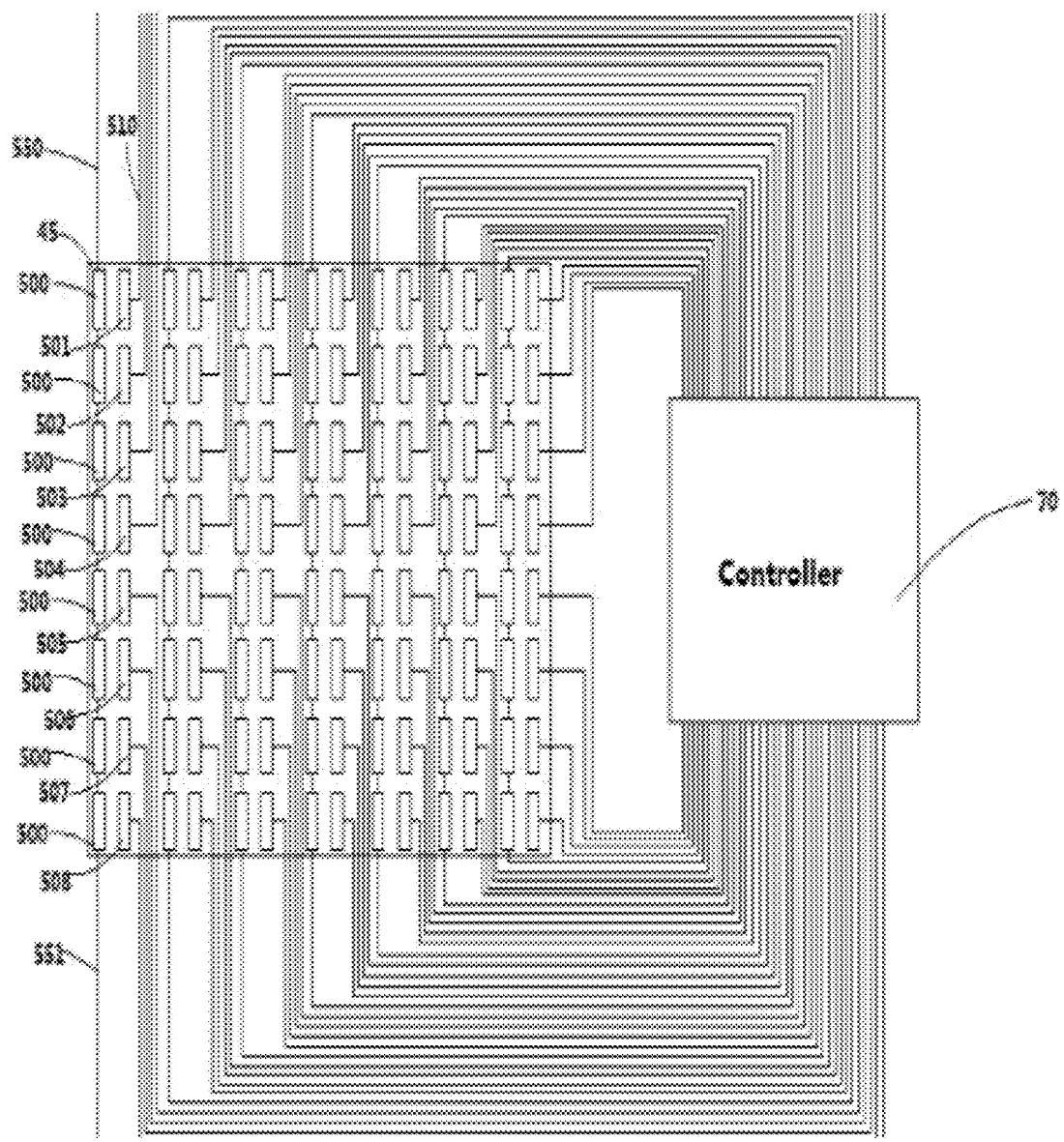
FIG. 11 shows a touch panel with all conductive electrodes and conductive lines placed on the same surface of a substrate where the driving electrode is divided into smaller electrodes.

FIG. 10 shows an embodiment where all conductive electrodes are placed on the same surface of substrate 45. In this embodiment, substrate 45 can be made of an opaque material or a transparent material or a substantially transparent material. If substrate 45 is made of a transparent or a substantially transparent material, it can be made of a glass or plastic. Conductive electrodes are placed on the same surface of substrate 45; the surface can be either the top surface of substrate 45 or the bottom surface of substrate 45. For simplicity the left column of conductive electrodes and corresponding conductive lines are numbered. Other conductive electrodes in different columns work in a similar manner. Conductive electrode 100 is the left most conductive electrode which is connected to controller 70 by conductive line 109. Conductive electrode has longer length than conductive electrodes 101, 102, 103, 104, 105, 106, 107 and 108. The number of conductive electrodes may change based on the design needs. While conductive electrode 100 in this embodiment has a longer length than conductive electrodes 101, 102, 103, 104, 105, 106, 107 and 108, it is easily possible to have a conductive electrode structure wherein conductive electrode 100 is divided into several conductive electrodes in smaller sizes. As a matter of fact this arrangement is shown in FIG. 11. Furthermore while a rectangular shape is used for conductive electrodes in this embodiment, the shape of conductive electrode 100 and conductive electrodes 101, 102, 103, 104, 105, 106, 107 and 108 and all other conductive electrodes used on the surface of substrate 45 can have different shapes, for example diamond, hexagonal, square, circle or any other shape. Conductive electrodes 101, 102, 103, 104, 105, 106, 107 and 108 are connected to controller 70 by conductive lines 110, 111, 112, 113, 114, 115, 116, 117. These conductive lines can be made of a transparent material, an opaque material, or a substantially transparent material. For example for a substantially transparent material indium tin oxide, indium zinc oxide, antomium tin oxide, aluminum zinc oxide, or any other suitable substantially transparent material can be used. For opaque material, metal such as silver, gold, copper or any other conductive metal can be used. Controller 70 has an electronic circuit to generate alternating current and sense signal from conductive electrodes. The sensing can be either in terms of sensing changes in current or voltage. Controller 70 can be built to have the capability of both current and voltage sensing. When drive/sense method of detecting a touch location is used, mutual capacitances between conductive electrode 100 and conductive electrodes 101, 102, 103, 104, 105, 106, 107 and 108 are used. In this case, controller 70 applies alternating current on conductive line 109. This alternating current reaches conductive electrode 100 since conductive line 109 is connected to conductive electrode 100. Part of the current flowing through conductive electrode 100 flows to neighboring conductive electrodes due to the mutual capacitance between conductive electrode 100 and conductive electrodes 101, 102, 103, 104, 105, 106, 107, 108. Since the distance between conductive electrode 100 and conductive electrodes 101, 102, 103, 104, 105, 106, 107, 108 are substantially similar, the leakage current from conductive electrode 100 to conductive electrodes 101, 102, 103, 104, 105, 106, 107 and 108 will be substantially similar. However even if the currents flowing to conductive electrodes 101, 102, 103, 104, 105, 106, 107 and 108 are not similar due to material and design differences, controller 70 measures these currents and places in a storage unit. This way controller 70 has a map of the surface of substrate 45. The process is repeated for each driving conductive electrode and all the sensing conductive electrodes are measured. When all driving conductive electrodes are applied current in a sequential manner and all sensing electrodes are sensed when one driving electrode is applied current, when the process is completed, a complete map of the surface of the substrate is established within controller 70. From that point on if an object with a capacitance touches the surface of substrate 45 or comes close to the surface of substrate 45 such that the object introduces capacitance, an additional capacitance between the touch location and ground will be introduced to the circuit. As controller 70 keeps driving the driving conductive electrodes and sensing the sensing conductive electrodes, the change in capacitance will be detected by controller 70 by detecting the change in current or voltage. The location where the change in current or voltage occurs is the location of touch. Controller 70 is able to detect multiple current or voltage changes on the surface which means multiple touch locations can be detected at the same time or at times close to each other.

The size of conductive electrodes may vary. The detailed view of conductive electrodes and conductive lines is shown in FIG. 8. Multiple conductive electrodes and conductive lines are used in FIG. 10 to form touch panel 80. Conductive electrodes and conductive lines can be made of a transparent material, an opaque material or a substantially transparent material or any combination thereof. Conductive lines carry electric current between controller 70 and conductive electrodes. In this embodiment, the surface is divided as an upper part and lower part. For the upper part, conductive lines connecting to conductive electrodes are routed towards the upper end of substrate 45. For the lower part, conductive lines connecting controller to conductive electrodes are routed towards the bottom end of substrate 45. This way, there is enough space between adjacent conductive electrodes to route conductive lines. In an alternative arrangement, all the conductive lines connecting to conductive electrodes can be routed either to the upper end or to the lower end of substrate 45. In yet another alternative arrangement, conductive lines can be routed to the left or to the right end of substrate 45. In another embodiment conductive lines may be routed randomly, some being routed to top part of substrate 45, some being routed to the bottom part of substrate 45, some being routed to the right part of substrate 45 and some being routed to the left part of substrate 45.

FIG. 11 shows another embodiment of the invention. In this embodiment, there are multiple conductive electrodes 500 that are used as driving electrodes on substrate 45. Conductive electrodes 500 are connected to each other by conductive wires. While it is shown that conductive electrodes 500 are connected to each other, it is also possible to connect each conductive electrode 500 to controller 70 individually. Conductive electrodes 501 through 508 are sensing electrodes and are individually connected to controller 70. While conductive lines connecting conductive electrodes 501 through 508 are shown in a certain way in FIG. 11, any wiring configuration can be used. For example conductive wires can be routed between driving electrodes and sensing electrodes. Additionally the conductive wires and conductive lines can be built such that once they reach the edge of the substrate they connect to the controller via a flexible printed circuit.

During the operation of the touch panel, each driving line 550 either driven by controller 70 individually in a sequence then sense all sense electrodes or driving lines may be driven simultaneously and sensing lines are sensed. In yet another embodiment, the odd numbered driving lines are driven by controller 70 while all sense lines are sensed and then even number of driving lines are driven by controller 70 and all sense lines are sensed. For example at the first instance $1^{st}$, $3^{rd}$, $5^{th}$, $7^{th}$ driving lines are driven while all sense lines are sensed. Then $2^{nd}$, $4^{th}$, $6^{th}$, and $8^{th}$ driving lines are driven while all sense lines are sensed. Alternatively, every $3^{rd}$ or $4^{th}$ or $n^{th}$ lines can be driven at the same time while the two nearest columns of sensing electrodes are sensed. Regardless of how the driving lines are driven, and how the sensing electrodes are sensed, a map of the touch panel showing the distribution of voltages, currents or capacitances is made during sensing the touch panel and stored in controller 70. If there is a touch on the touch panel, the capacitance at the touch point will change and this change will alter the new map. When the new map is compared to the map in storage, a touch point will be detected where the difference in the map is.

I claim:

1. A capacitive touch panel, comprising:
   a plurality of driving electrodes, wherein each driving electrode extends along a first direction;
   a plurality of columns of sensing electrodes, wherein each column is orientated along a second direction parallel with the first direction, and each sensing electrode extends along the second direction;
   a plurality of first conductive lines connected to the plurality of driving electrodes; and
   a plurality of second conductive lines connected to the plurality of columns of sensing electrodes, wherein one second conductive line corresponds to one sensing electrode,
   wherein each driving electrode and each column of sensing electrodes are arranged alternatively,
   wherein all the first conductive lines and all the second conductive lines are adapted for connecting to a controller;
   wherein the plurality of driving electrodes are capable of generating an electrical field when an alternating current is applied to the plurality of driving electrodes and the electric field causes capacitive reactance to be generated between the plurality of driving electrodes and the plurality of columns of sensing electrodes to detect at least one touch location on the capacitive touch panel.

2. The capacitive touch panel of claim 1, wherein each driving electrode is longer than each sensing electrode.

3. The capacitive touch panel of claim 2, wherein all the driving electrodes and all the sensing electrodes are made of a transparent material.

4. The capacitive touch panel of claim 3, wherein all the driving electrodes and all the sensing electrodes are made of indium tin oxide.

5. The capacitive touch panel of claim 2, wherein all the driving electrodes and all the sensing electrodes are made of an opaque material.

6. The capacitive touch panel of claim 5, wherein all the driving electrodes and all the sensing electrodes are made of silver, copper or gold.

7. The capacitive touch panel of claim 2, wherein dimensions of the driving electrodes are adapted to provide a capacitance where a signal to noise ratio at an output of the capacitive touch panel is maximized.

8. The capacitive touch panel of claim 1, wherein the plurality of driving electrodes and the plurality of columns of sensing electrodes are placed on a top layer of a substrate, and the plurality of first conductive lines and the plurality of second conductive lines are placed on a bottom layer of the substrate to form a dual layer structure;
   wherein electrical connections between the plurality of first conductive lines and the plurality of driving electrodes, and electrical connections between the plurality of second conductive lines and the plurality of columns of sensing electrodes are provided through a plurality of via holes filled with a conductive material.

* * * * *